United States Patent [19]

Holson

[11] 4,244,762
[45] Jan. 13, 1981

[54] HEAT SEALED PHOTO ALBUM PAGE AND METHOD OF MAKING SAME

[75] Inventor: Sheldon Holson, Norwalk, Conn.
[73] Assignee: The Holson Company, Wilton, Conn.
[21] Appl. No.: 37,701
[22] Filed: May 10, 1979
[51] Int. Cl.³ .......................... B29C 27/08; B32B 3/06; B42F 5/04
[52] U.S. Cl. .................................. 156/73.1; 40/124.2; 40/159; 156/290; 428/172; 428/198
[58] Field of Search .............................. 40/124.2, 159; 156/73.1, 290; 428/195, 198, 172

[56] References Cited
U.S. PATENT DOCUMENTS

| 3,651,591 | 3/1972 | Woodyard | 40/159 X |
| 3,666,599 | 5/1972 | Obeda | 156/538 |
| 4,019,937 | 4/1977 | Holson | 156/73.1 |

Primary Examiner—John T. Goolkasian
Assistant Examiner—Robert A. Dawson
Attorney, Agent, or Firm—Charles E. Temko

[57] ABSTRACT

A photographic album page comprising a fibrous centrally disposed lamina and a pair of overlying clear synthetic resinous laminae. Pockets are formed by ultrasonic sealing of the clear laminae together through the fibrous lamina which disintegrates under the generated heat of sealing. The pockets are thus formed as a continuous sealing operation at the same time the page is laminated by sealing in broken lines, whereby the fibrous lamina retains its structural integrity.

2 Claims, 4 Drawing Figures

HEAT SEALED PHOTO ALBUM PAGE AND METHOD OF MAKING SAME

BACKGROUND OF THE INVENTION

This invention relates generally to the field of photographic album pages of laminated type, in which a pair of clear laminae are overlaid upon the opposed surfaces of a fibrous layer to form a pair of pockets open along at least one edge thereof for the insertion of photographic prints or the like. Album pages of this general type are known in the art, and are normally manufactured in sizes corresponding to the size of the retained prints, one print being thereby displayed on each side of the page. Where the page is relatively large and is employed to retain more than one print on each side, the inner fibrous layer is usually coated with a pressure-sensitive adhesive which engages both the retained prints and the clear lamina overlying the prints. In this construction, the page is opened for the positioning of the prints by peeling the clear lamina from the adhesively coated fibrous lamina. This is a more expensive construction to manufacture, both in terms of the number of steps required, and the materials used.

It is also known to manufacture an album page entirely from paper stock, the laminae of which are glued along predetermined areas to form pockets of desired size. This construction requires the initial formation of foldable cut blanks which are embossed or printed prior to assembly, again a relatively expensive construction.

It is also known to make photo album pages completely of synthetic resinous materials, in which the various laminae are bar-sealed using radio frequency sealing means. These pages are quite serviceable, but where the outermost lamina is necessarily transparent, it is often required to insert a paper backing to provide an attractive appearance.

Constantly increasing costs of materials and production have made desirable the development of a simplified technique for the manufacture of relatively large photographic album pages using light-weight materials with accurately formed pockets and high mechanical strength. Such pages preferably include a clear lamina which protects the surface of prints stored therebeneath. The pages also require for appearance's sake the presence of a non-transparent lamina, with the pockets formed by the sealing of the clear outer laminae together. The cutting of such non-transparent lamina, and the insertion of the same into a formed pocket cannot be satisfactorily accomplished at low cost at the present state of development of the art.

SUMMARY OF THE INVENTION

Briefly stated, the invention contemplates the provision of an improved album page of the type above described which includes a pair of clear outer laminae formed from synthetic resinous materials, and a fibrous paper lamina positioned therebetween. The page is subdivided into pockets of desired size by ultrasonic stitching of the two clear laminae together, directly through the paper layer, without any previous cutting or inserting of the paper layer. The material forming the paper in the sealed areas is vaporized under the heat necessary to fuse the synthetic resinous laminae. The sealing is performed as a run of stitches rather than as a continuous line, to allow for adequate venting of the consumed paper during the sealing operation, and to maintain the structural integrity of the paper layer.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
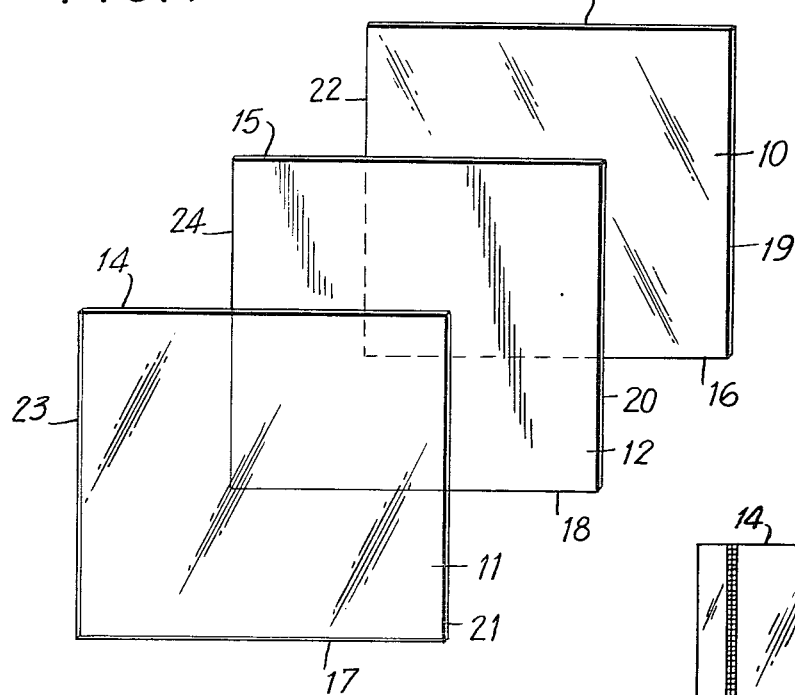
FIG. 1 is an exploded view in perspective, showing a first step in the manufacture of an album page in accordance with the disclosed invention.

Referring to FIG. 1 in the drawing, as a first step in the disclosed method, there are provided a first clear rectangular lamina 10, a second clear rectangular lamina 11, and a third non-transparent fibrous lamina 12. The laminae 10–12 inclusive, are rectangular in configuration, being bounded by upper edges 13, 14 and 15; lower edges 16, 17 and 18; outer side edges 19, 20 and 21; and inner side edges 22, 23 and 24.

Figure 2:
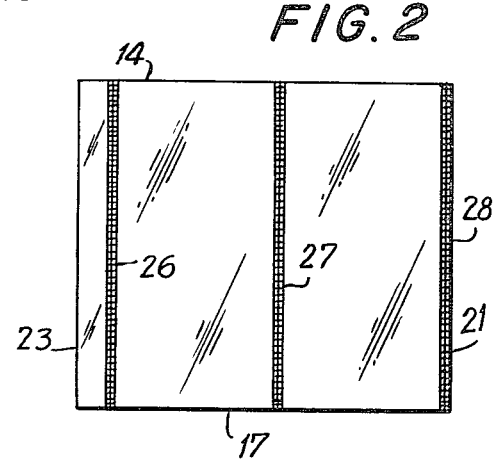
FIG. 2 is a view in elevation showing the completion of a subsequent step.

Referring to FIG. 2, prior to sealing, the laminae 10–12 are placed in substantially congruent relation and a plurality of vertical ultrasonic stitching lines are made as indicated by reference characters 26, 27 and 28. Following this, the assembly is rotated through 90°, and a horizontal stitch line 29 is provided.

At this point, the page is essentially completed, except for the provision of the usual punching of loose-leaf perforations 30, where desired. Where the page is to be bound within a cover by glue means, this last step may be eliminated.

Figure 3:
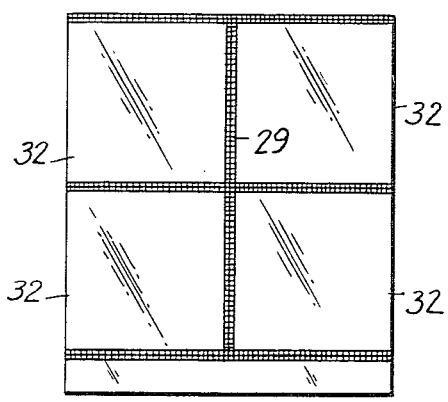
FIG. 3 is a view in elevation showing a further step in the method.
Figure 4:
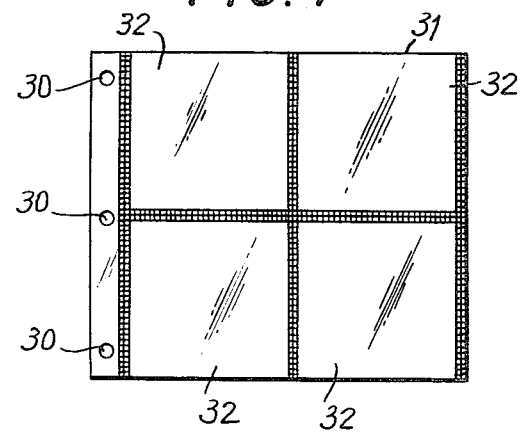
FIG. 4 is a view in elevation showing a completed album page.

The stitching is preferably performed using a device such as that disclosed in the Obeda U.S. Pat. No. 3,666,599 granted May 30, 1972. Reference is made to FIG. 3 of this patent which shows suitable stitching patterns of a discontinuous type, all of the patterns illustrated in that figure, with the exception of the leftwardmost being suitable. The use of discontinous stitching permits the fibrous lamina to be captivated without weakening its mechanical strength. Also, such patterns, because of their relatively small area, permit the paper comprising the fibrous lamina to be readily vaporized without difficulty. It will be observed that the stitching lines leave essentially unconnected the upper and lower edges of the assembled page, generally indicated by reference character 31, to provide entry to the pockets 32 formed on either side which overlie the fibrous layer 12. It will be understood that the four pocket pattern illustrated in FIGS. 3 and 4 is exemplary, and the number of pockets per page, as well as the specific rectangular configuration, may be varied as desired.

I wish it to be understood that I do not consider the invention limited to the precise details as shown and set forth in this specification, for obvious modifications will occur to those skilled in the art to which the invention pertains.

I claim:

1. The method of forming a photographic album page comprising the steps of:
    (a) Providing a first rectangular fibrous non-heat sealable lamina;

(b) Providing second and third rectangular clear heat-sealable laminae of substantially similar overall dimensions;

(c) Placing said clear laminae in congruent relation with the fibrous lamina positioned between the clear laminae;

(d) Using an ultrasonic stitching device, interconnecting said laminae by sealing the two outer laminae together to form plural pockets on each side of said fibrous lamina, said fibrous lamina being penetrated at the points of stitching in such manner that material comprising said lamina are vaporized under sealing heat to bring sealed areas of said clear laminae into integral relation to captivate said fibrous lamina therebetween.

2. The method in accordance with claim 1, further characterized in the use of a non-continuous electronic stitch which avoids completely severing the fibrous lamina at the lines of stitching.

* * * * *